United States Patent
Dewey et al.

(10) Patent No.: US 9,532,232 B2
(45) Date of Patent: Dec. 27, 2016

(54) DETECTION AND LOCATION OF WIRELESS FIELD DEVICES

(75) Inventors: Alan Roger Dewey, Plymouth, MN (US); Joseph Citrano, III, Eden Prairie, MN (US); Todd Mitchell Toepke, Eden Prairie, MN (US); Alden Chester Russell, III, Minnetonka, MN (US); Eric D. Rotvold, West Saint Paul, MN (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 585 days.

(21) Appl. No.: 12/780,325

(22) Filed: May 14, 2010

(65) Prior Publication Data

US 2010/0290359 A1    Nov. 18, 2010

Related U.S. Application Data

(60) Provisional application No. 61/178,757, filed on May 15, 2009.

(51) Int. Cl.
*H04L 27/04* (2006.01)
*H04W 16/18* (2009.01)
*G05B 19/418* (2006.01)

(52) U.S. Cl.
CPC .......... *H04W 16/18* (2013.01); *G05B 19/4185* (2013.01); *G05B 2219/23406* (2013.01); *G05B 2219/24167* (2013.01); *G05B 2219/25062* (2013.01); *G05B 2219/31131* (2013.01); *Y02P 90/18* (2015.11)

(58) Field of Classification Search
CPC ...... H04W 84/18; H04W 84/12; H04W 80/04; H04W 8/26
USPC ............ 370/310, 310.2, 328, 338, 349, 400
See application file for complete search history.

(56) References Cited

U.S. PATENT DOCUMENTS

| | | | |
|---|---|---|---|
| 5,195,392 A | 3/1993 | Moore et al. | 73/866.5 |
| 5,309,351 A | 5/1994 | McCain et al. | 364/132 |
| 5,442,639 A | 8/1995 | Crowder et al. | 371/20.1 |

(Continued)

FOREIGN PATENT DOCUMENTS

| | | |
|---|---|---|
| CN | 101149267 A | 3/2008 |
| CN | 101763576 | 6/2010 |

(Continued)

OTHER PUBLICATIONS

Product Data Sheet: VIATOR RS232. MACTek Measurement and Control Technologies retrieved from www.mactekcorp.com/productl.htm.

(Continued)

*Primary Examiner* — Brenda H Pham
(74) *Attorney, Agent, or Firm* — Christopher R. Christenson; Kelly, Holt & Christenson PLLC

(57) ABSTRACT

A method of evaluating a potential location to add a wireless field device to an existing network of a plurality of existing wireless field devices is provided. The method includes placing a handheld field maintenance tool in the potential location and causing the handheld field maintenance tool to identify wireless field devices within communicative range of the potential location. Information related to wireless communication at the potential location is viewed. Methods are also provided for identifying a selected field device in a process installation using a handheld field maintenance tool.

5 Claims, 9 Drawing Sheets

(56) References Cited

U.S. PATENT DOCUMENTS

| | | | |
|---|---|---|---|
| 5,598,572 A * | 1/1997 | Tanikoshi | G05B 19/042 342/450 |
| 5,613,217 A | 3/1997 | Hagstrom et al. | |
| 5,823,831 A | 10/1998 | Bowater et al. | |
| 5,903,455 A | 5/1999 | Sharpe, Jr. et al. | 364/188 |
| 6,033,226 A | 3/2000 | Bullen | 434/219 |
| 6,211,649 B1 | 4/2001 | Matsuda | 320/115 |
| 6,236,223 B1 | 5/2001 | Brady et al. | 324/750.3 |
| 6,377,859 B1 | 4/2002 | Brown et al. | 700/79 |
| 6,614,634 B1 * | 9/2003 | Westerfeld et al. | 361/62 |
| 6,633,782 B1 | 10/2003 | Schleiss et al. | 700/26 |
| 6,725,182 B2 | 4/2004 | Pagnano et al. | 702/188 |
| 6,971,063 B1 | 11/2005 | Rappaport et al. | 715/733 |
| 7,013,184 B2 | 3/2006 | Romagnoli et al. | 700/17 |
| 7,027,952 B2 | 4/2006 | DelaCruz et al. | |
| 7,039,744 B2 | 5/2006 | Mathiowetz et al. | |
| 7,054,695 B2 | 5/2006 | Opheim et al. | |
| 7,098,771 B2 | 8/2006 | Lefebvre et al. | |
| 7,120,391 B2 | 10/2006 | Stengele et al. | |
| 7,188,200 B2 | 3/2007 | Griech | 710/100 |
| 7,337,369 B2 | 2/2008 | Barthel et al. | 714/43 |
| 7,400,255 B2 | 7/2008 | Horch | 340/572.7 |
| 7,421,531 B2 | 9/2008 | Rotvold et al. | 710/305 |
| 7,454,252 B2 | 11/2008 | El-Sayed | 700/21 |
| 7,505,819 B2 | 3/2009 | El-Sayed | 700/21 |
| 7,506,812 B2 | 3/2009 | von Mueller et al. | 235/449 |
| 7,596,372 B2 | 9/2009 | Warren | |
| 7,675,406 B2 | 3/2010 | Baier et al. | 340/506 |
| 7,733,833 B2 | 6/2010 | Kalika et al. | 370/338 |
| 7,797,061 B2 | 9/2010 | El-Sayed | 700/21 |
| 7,832,638 B2 | 11/2010 | Wetzel et al. | |
| 7,840,912 B2 | 11/2010 | Elias et al. | 715/863 |
| 7,940,508 B2 | 5/2011 | Helfrick et al. | 361/119 |
| 7,965,664 B2 | 6/2011 | Hodson et al. | 370/310 |
| 8,000,815 B2 | 8/2011 | John et al. | 700/18 |
| 8,036,007 B2 | 10/2011 | Woehrle | 363/65 |
| 8,044,796 B1 | 10/2011 | Carr, Sr. | |
| 8,059,101 B2 | 11/2011 | Westerman et al. | 345/173 |
| 8,060,862 B2 | 11/2011 | Eldridge et al. | 717/121 |
| 8,060,872 B2 | 11/2011 | Da Silva Neto | 717/177 |
| 8,074,172 B2 | 12/2011 | Kocienda et al. | 715/263 |
| 8,126,145 B1 | 2/2012 | Tewari et al. | 380/255 |
| 8,150,462 B2 | 4/2012 | Guenter et al. | 455/557 |
| 8,180,948 B2 | 5/2012 | Kreider et al. | 710/313 |
| 8,224,256 B2 | 7/2012 | Citrano, III et al. | 455/67.11 |
| 2001/0047504 A1 | 11/2001 | Aoyama | 714/799 |
| 2002/0004370 A1 | 1/2002 | Stengele et al. | 455/39 |
| 2002/0007237 A1 | 1/2002 | Phung et al. | 701/33 |
| 2002/0027504 A1 | 3/2002 | Davis et al. | 340/540 |
| 2002/0065631 A1 | 5/2002 | Loechner | |
| 2002/0086642 A1 | 7/2002 | Ou et al. | 455/69 |
| 2002/0167904 A1 | 11/2002 | Borgeson et al. | 370/241 |
| 2002/0171558 A1 | 11/2002 | Bartelheim et al. | 340/825.49 |
| 2002/0188466 A1 | 12/2002 | Barrette et al. | 705/2 |
| 2003/0050737 A1 | 3/2003 | Osann, Jr. | 700/276 |
| 2003/0109937 A1 | 6/2003 | Zielinski et al. | 700/1 |
| 2003/0204373 A1 * | 10/2003 | Zielinski et al. | 702/184 |
| 2003/0229472 A1 | 12/2003 | Kantzes et al. | 702/183 |
| 2004/0039458 A1 * | 2/2004 | Mathiowetz et al. | 700/17 |
| 2004/0111238 A1 | 6/2004 | Kantzes et al. | 702/183 |
| 2004/0193287 A1 | 9/2004 | Lefebvre et al. | 700/1 |
| 2004/0204193 A1 | 10/2004 | Li et al. | 455/575.1 |
| 2004/0228184 A1 | 11/2004 | Mathiowetz | 365/202 |
| 2004/0230327 A1 | 11/2004 | Opheim et al. | 700/83 |
| 2005/0114086 A1 | 5/2005 | Zielinski et al. | 702/184 |
| 2005/0117454 A1 | 6/2005 | Millikin | |
| 2005/0164684 A1 | 7/2005 | Chen et al. | 455/414.1 |
| 2005/0222698 A1 | 10/2005 | Eryurek et al. | 700/90 |
| 2005/0223120 A1 | 10/2005 | Scharold et al. | 700/1 |
| 2006/0014533 A1 | 1/2006 | Warren | 455/423 |
| 2006/0087402 A1 | 4/2006 | Manning et al. | 340/3.1 |
| 2006/0111955 A1 | 5/2006 | Winter et al. | |
| 2006/0155908 A1 | 7/2006 | Rotvold et al. | 710/315 |
| 2006/0161393 A1 | 7/2006 | Zielinski et al. | 702/184 |
| 2006/0206277 A1 | 9/2006 | Horch | 702/82 |
| 2006/0290496 A1 | 12/2006 | Peeters | 340/572.1 |
| 2006/0291438 A1 | 12/2006 | Karschnia et al. | 370/338 |
| 2007/0161352 A1 | 7/2007 | Dobrowski et al. | 455/69 |
| 2007/0161371 A1 | 7/2007 | Dobrowski et al. | 455/423 |
| 2007/0179645 A1 | 8/2007 | Nixon et al. | 700/83 |
| 2007/0208279 A1 | 9/2007 | Panella et al. | 600/595 |
| 2008/0114911 A1 | 5/2008 | Schumacher | 710/72 |
| 2008/0194298 A1 | 8/2008 | Panabaker et al. | |
| 2008/0234837 A1 | 9/2008 | Samudrala et al. | 700/19 |
| 2008/0268784 A1 * | 10/2008 | Kantzes et al. | 455/66.1 |
| 2008/0313559 A1 | 12/2008 | Kulus et al. | |
| 2009/0055090 A1 * | 2/2009 | Cowley et al. | 701/207 |
| 2009/0065578 A1 | 3/2009 | Peterson et al. | 235/382 |
| 2009/0067481 A1 | 3/2009 | Sisley et al. | |
| 2009/0094466 A1 | 4/2009 | Matthew et al. | 713/300 |
| 2009/0112460 A1 * | 4/2009 | Baker et al. | 701/208 |
| 2009/0125713 A1 | 5/2009 | Karschnia et al. | 713/153 |
| 2009/0171483 A1 | 7/2009 | Scheuermann | 700/83 |
| 2009/0177970 A1 | 7/2009 | Jahl et al. | 715/735 |
| 2009/0271726 A1 | 10/2009 | Gavimath et al. | 715/771 |
| 2009/0284390 A1 * | 11/2009 | Lahner et al. | 340/825.49 |
| 2009/0296601 A1 | 12/2009 | Citrano et al. | 370/254 |
| 2009/0316628 A1 | 12/2009 | Enns et al. | |
| 2009/0326852 A1 | 12/2009 | Vetter et al. | 702/108 |
| 2010/0100766 A1 | 4/2010 | Bengtsson et al. | 714/23 |
| 2010/0114347 A1 | 5/2010 | Dheenathayalan et al. | 700/97 |
| 2010/0114549 A1 | 5/2010 | Kolavi | 703/13 |
| 2010/0145476 A1 | 6/2010 | Junk et al. | 700/7 |
| 2010/0220630 A1 | 9/2010 | Kalika et al. | 370/254 |
| 2010/0267359 A1 | 10/2010 | Gyllensvaan | |
| 2010/0290084 A1 | 11/2010 | Russell, III et al. | 358/1.15 |
| 2010/0290351 A1 | 11/2010 | Toepke et al. | 370/250 |
| 2010/0290359 A1 | 11/2010 | Dewey et al. | 370/252 |
| 2010/0293363 A1 | 11/2010 | Meyer et al. | 713/1 |
| 2011/0117529 A1 | 5/2011 | Barash et al. | 434/265 |
| 2011/0238188 A1 | 9/2011 | Washiro | 700/19 |
| 2012/0038458 A1 | 2/2012 | Toepke et al. | 340/6.1 |
| 2012/0038548 A1 | 2/2012 | Toepke et al. | 345/156 |
| 2012/0038760 A1 | 2/2012 | Kantzes et al. | 348/61 |
| 2012/0040316 A1 | 2/2012 | Mathiowetz et al. | 434/219 |
| 2012/0040698 A1 | 2/2012 | Ferguson et al. | 455/457 |
| 2012/0041744 A1 | 2/2012 | Kantzes et al. | 703/13 |
| 2012/0046911 A1 | 2/2012 | Mathiowetz et al. | 702/184 |
| 2014/0036712 A1 | 2/2014 | Dewey et al. | |

FOREIGN PATENT DOCUMENTS

| | | |
|---|---|---|
| DE | 10245176 | 4/2004 |
| DE | 102007035158 | 1/2009 |
| DE | 102008029406 | 12/2009 |
| DE | 102009028195 | 2/2011 |
| EP | 1515208 | 3/2005 |
| EP | 1688758 | 8/2006 |
| EP | 1916582 | 4/2008 |
| EP | 2071427 | 6/2009 |
| EP | 2077473 | 7/2009 |
| EP | 2148259 | 1/2010 |
| EP | 2204705 | 7/2010 |
| GB | 2382418 | 5/2003 |
| GB | 2 394 124 | 4/2004 |
| JP | 9051583 | 2/1997 |
| JP | H09-51583 A | 2/1997 |
| JP | H1165641 | 3/1999 |
| JP | 11202904 | 7/1999 |
| JP | H11353332 | 12/1999 |
| JP | 2000092240 | 3/2000 |
| JP | 2001125633 | 5/2001 |
| JP | 2001337004 | 7/2001 |
| JP | 2001337004 A | 12/2001 |
| JP | 2003241829 | 8/2003 |
| JP | 2006060696 A | 3/2006 |
| JP | 2007-91381 | 4/2007 |
| JP | 2008520050 | 6/2008 |
| JP | 2008165193 | 7/2008 |
| JP | 2009004977 | 1/2009 |
| JP | 2009036720 | 2/2009 |
| JP | 2009105895 | 5/2009 |
| KR | 20060078883 | 7/2006 |
| KR | 100864176 | 10/2008 |

(56) References Cited

FOREIGN PATENT DOCUMENTS

| RU | 43161 U1 | 1/2005 |
|---|---|---|
| RU | 80588 U1 | 2/2009 |
| RU | 2361177 | 7/2009 |
| WO | WO 01/35190 | 5/2001 |
| WO | WO 02/086662 | 10/2002 |
| WO | WO2004076977 | 9/2004 |
| WO | WO 2006/016845 | 2/2006 |
| WO | WO 2006/022429 | 3/2006 |
| WO | WO 2008/042074 | 4/2008 |
| WO | WO 2008/077358 | 7/2008 |
| WO | WO 2008/087571 | 7/2008 |
| WO | WO 2008/096216 | 8/2008 |
| WO | WO 2008/127632 | 10/2008 |
| WO | WO 2009/003146 | 12/2008 |
| WO | WO 2009/003148 | 12/2008 |
| WO | WO 2009/074544 | 6/2009 |

OTHER PUBLICATIONS

ABB Limited: "Wireless Instrumentation Jargon Buster". Information bulletin instrumentation ABB no IB/INST-018, Mar. 3, 2009, XP002596601. Retrieved from the Internet: URL:http://www05.abb.com/global/scot/scot203.nsf/veritydisplay/be00ec76ef07e978c125756e003157b9/$File/IB_TNST_018_1.pdf.
Decision of Rejection for JP Patent Application No. 2012-511048 dispatched on Oct. 1, 2013.
Office Action from related Japanese patent application No. 2012511041, dated Feb. 12, 2013.
Office Action from related Russian application No. 2011151065 dated Feb. 7, 2013.
Office Action from related Japanese patent application No. 2012511035, dated Feb. 26, 2013.
Office Action from corresponding Russian application No. 2011151063 dated Mar. 12, 2013.
Rosemount 3051SMV Quick Installation Guide 00825-0100-4803 Rev BA. Apr. 2011.
Notification of Transmittal of the International Search Report and the Written Opinion from the International Application No. PCT/US2011/045680 dated Jul. 6, 2012.
Notification of Transmittal of the International Search Report and the Written Opinion from the International Application No. PCT/US2011/045681 dated Jan. 5, 2012.
Invitation to Pay Additional Fees from the International Application No. PCT/US2011/045673 dated Jan. 16, 2012.
475 Field Communicator. User's Guide XP007919976. Aug. 2009. www.fieldcommunicator.com by Emerson Process Management.
First Communication for the related European patent application No. 107302812 dated Oct. 11, 2012.
International Search Report and Written Opinion from the related International patent application No. PCT/US2011/045664 dated Nov. 6, 2012.
International Search Report and Written Opinion from the related International patent application No. PCT/US2011/045679 dated Nov. 6, 2012.
International Search Report and Written Opinion from the related International patent application No. PCT/US2011/045665 dated Nov. 6, 2012.
First Communication from related European patent application No. 107255432 dated Oct. 11, 2012.
First Communication from related European patent application No. 107302796 dated Oct. 19, 2012.
Office Action from corresponding Russian application No. 2011151063 dated Nov. 12, 2012.
Chinese 1st Official Action dated Jun. 25, 2013 in related application No. 201080011972.0, 8 pgs. With English Translation.
First Office Action from corresponding Japanese application No. 2015511048, dated Jan. 29, 2013.
Invitation to pay additional fees from the related International patent application No. PCT/US2011/045679 dated Aug. 6, 2012.
Invitation to pay additional fees from the related International patent application No. PCT/US2011/045664 dated Aug. 9 , 2012.
Invitation to pay additional fees from the related International patent application No. PCT/US2011/045676 dated Jul. 30, 2012.
Lee S W et al: "Honam Petrochemical Corporation Uses Simulator for Ethylene Plant Operator Training", Processing of the Industrial Computing Conference. Houston, Oct. 18-23, 1992. PP. 219-222.
Kurrle H-P et al.: "Trainingssimulator Zur Ausbildung Von Chemikanten und Anlagenfahrern. Otraining Simulator For the Training of Process Workers (Chemikanten) and Operators", Automatisierungstechnische Praxis—ATP, Oldenbourg Indusrieverlag, Munchen, DE, vol. 36, No. 7, Jul. 1, 1994. Abstract, Section 2.
Bushman J B: "Ally: An Operator's Associate for Cooperative Supervisory Control Systems", IEEE Transactions on Systems, Man and Cybernetics, IEEE Inc. New York, US, vol. 23, No. 1, Jan. 1, 1993, pp. 111-128.
Notification of Transmittal of the International Search Report and the Written Opinion from the International Application No. PCT/US2010/034949.
Notification of Transmittal of the International Search Report and the Written Opinion from the International Application No. PCT/US2010/034889.
Notification of Transmittal of the International Search Report and the Written Opinion for the International application No. PCT/US2010/034848 dated Aug. 26, 2010.
Technical Data Sheet: VIATOR® USB HART® Interface (Model 010031). MACTek Measurement and Control Technologies.
David Gustafsson: "WirelessHART—Implementation and Evaluation on Wireless Sensors". Masters's Degree Project, Kth University, Electrical Engineering, Apr. 1, 2009, pp. 1-39, XP002596602, Stockholm, Sweden. Retrieved from the Internet: URL:http://www.ee.kth.se/php/modules/publications/reports/2009/XR-EE-RT%202009:003.pdf.
VIATOR® Bluetooth® Wireless Technology Interface for use with HART field devices. MACTek Measurement and Control Technologies retrieved from www.mactekcorp.com/product5.htm.
Product Data Sheet: VIATOR RS232. MACTek Measurement and Control Technologies retrieved from www.mactekcorp.com/product1.htm.
ABB Limited: "Wireless Instrumentation Jargon Buster". Information bulletin instrumentation ABB no IB/INST-018, Mar. 3, 2009, XP002596601. Retrieved from the Internet: URL:http://www05.abb.com/global/scot/scot203.nsf/veritydisplay/be00ec76ef07e978c125756e003157b9/$File/IB_INST_018_1.pdf.
Invitation to Pay Additional Fees for international patent application No. PCT/US2010/034889 dated Sep. 15, 2010.
Invitation to Pay Additional Fees for international patent application No. PCT/US2010/034949 dated Sep. 17, 2010.
EPO Communication pursuant to Rules 161(1) and 162 EPC for European patent application No. 10701430.0 dated Aug. 30, 2011.
EPO Communication from related European application No. 10730279.6 dated Jan. 13, 2012.
EPO Communication from corresponding European application No. 10730281.2 dated Jan. 13, 2012.
EPO Communication from related European application No. 10725543.2 dated Jan. 12, 2012.
Notification of Transmittal of the International Search Report and the Written Opinion from the International Application No. PCT/US2010/021764.
Possio Bluetooth to WLAN Gateway PX20: Full Product Description retrieved from http://www.blueunplugged.com/p.aspx?p=105816.
1420 Wireless Gateway: Product Data Sheet 00813-0100-4420, Rev BA Mar. 2008. Emerson Process Management.
Smart Wireless Gateway (WirelessHART™). Quick Installation Guide 00825-0200-4420, Rev BA. Aug. 2009. Emerson Process Management.
1420 Wireless Gateway. Reference Manual 00809-0100-4420, Rev BA. Aug. 2007. Emerson Process Management.

(56) References Cited

OTHER PUBLICATIONS

Rosemount 3051S Wireless Series Scalable Pressure, Flow, and Level Solutions. Reference Manual 00809-0100-4802, rev BA. Aug. 2007. Emerson Process Management.
Decision of Refusal from counterpart Russian patent application No. 2011151063, dispatched Oct. 30, 2013. 8 pages.
Second Office Action from counterpart Chinese patent application No. 201080011972.0, issuing date Jan. 27, 2014. 13 pages.
Office Action from counterpart Canadian patent application No. 2762092, dated May 22, 2014. 5 pages.
Office Action from counterpart Canadian Patent Application No. 2,762,092 dated Jan. 29, 2015, 5 pages.
European Search Report for Application No. 13 15 6367 dated Sep. 26, 2014, 12 pages.
Canadian Office Action from Patent Application No. 2,762,092, date of mailing: Jun. 11, 2013. 3 pages.
Canadian Office Action from Patent Application No. 2,806,949, date of mailing: Aug. 14, 2014. 3 pages.
Russian Office Action from Patent Application No. 2013108821, dated Jul. 30, 2014. 22 pages with English Translation.
Japanese Office Action from Patent Application No. 2013-521967, dated Sep. 24, 2014. 7 pages with English Translation.
Russian Office Action from Patent Application No. 2013102577, dated Jul. 28, 2014. 14 pages with English Translation.
Office Action for Canadian Patent Application No. 2,837,040 dated Apr. 7, 2016, 3 pages.
Decision on Refusal to Grant a Patent for Invention for Russian Patent Application No. 2013102577, dated Aug. 10, 2015, 13 pages.
Office Action for Canadian Application No. 2,837,940 dated May 19, 2015, 3 pages.

\* cited by examiner

DETECTION AND LOCATION OF WIRELESS FIELD DEVICES

CROSS-REFERENCE TO RELATED APPLICATION

The present application is based on and claims the benefit of U.S. provisional patent application Ser. No. 61/178,757, filed May 15, 2009, the content of which is hereby incorporated by reference in its entirety.

BACKGROUND

In industrial settings, control systems are used to monitor and control industrial and chemical processes, and the like. Typically, the process control system performs these functions using field devices distributed at key locations in the industrial process and coupled to the control circuitry in the control room by a process control loop. Field devices generally perform a function, such as sensing a parameter or operating upon the process, in a distributed control or process monitoring system.

Some field devices include a transducer. A transducer is understood to mean either a device that generates an output signal based on a physical input or that generates a physical output based on an input signal. Typically, a transducer transforms an input into an output having a different form. Types of transducers include various analytical equipment, pressure sensors, thermistors, thermocouples, strain gauges, flow transmitters, positioners, actuators, solenoids, indicator lights, and others.

Some process installations may involve highly volatile, or even explosive, environments. Accordingly, it is often beneficial, or even required, for field devices and the handheld field maintenance tools used with such field devices to comply with intrinsic safety requirements. These requirements help ensure that compliant electrical devices will not generate a source of ignition even under fault conditions. One example of Intrinsic Safety requirements is set forth in: APPROVAL STANDARD INTRINSICALLY SAFE APPARATUS AND ASSOCIATED APPARATUS FOR USE IN CLASS I, II and III, DIVISION NUMBER 1 HAZARDOUS (CLASSIFIED) LOCATIONS, CLASS NUMBER 3610, promulgated by Factory Mutual Research October, 1998. Examples of handheld field maintenance tools that comply with intrinsic safety requirements include those sold under trade designations Model 375 Field Communicator and Model 475 Field Communicator, available from Emerson Process Management of Austin, Tex.

Typically, each field device also includes communication circuitry that is used for communicating with a process control room, or other circuitry, over a process control loop. Traditionally, analog field devices have been connected to the control room by two-wire process control current loops. In some installations, wireless technologies have begun to be used to communicate with field devices. Wireless operation simplifies field device wiring and set-up.

One wireless process communication technology standard is known as the WirelessHART standard. The WirelessHART standard was published by the HART Communication Foundation in September 2007. Relevant portions of the Wireless HART® Specification include: HCF_Spec 13, revision 7.0; HART Specification 65—Wireless Physical Layer Specification; HART Specification 75—TDMA Data Link Layer Specification (TDMA refers to Time Division Multiple Access); HART Specification 85—Network Management Specification; HART Specification 155—Wireless Command Specification; and HART Specification 290—Wireless Devices Specification.

Another wireless network communication technology is set forth in ISA100.11a. This technology proposes wireless communication at the 2.4 GHz frequency using radio circuitry in accordance with IEEE 802.15.4-2006. The ISA100.11 standard is maintained by the International Society of Automation (ISA).

While these wireless communication technologies provide important advantages to the art of process control and communication, traditional techniques for maintaining and configuring wireless field devices that employ such communication is sometimes rendered inefficient.

SUMMARY

A method of evaluating a potential location to add a wireless field device to an existing network of a plurality of existing wireless field devices is provided. The method includes placing a handheld field maintenance tool in the potential location and causing the handheld field maintenance tool to identify wireless field devices within communicative range of the potential location. Information related to wireless communication at the potential location is viewed. Methods are also provided for identifying a selected field device in a process installation using a handheld field maintenance tool.

DETAILED DESCRIPTION

Figure 1:
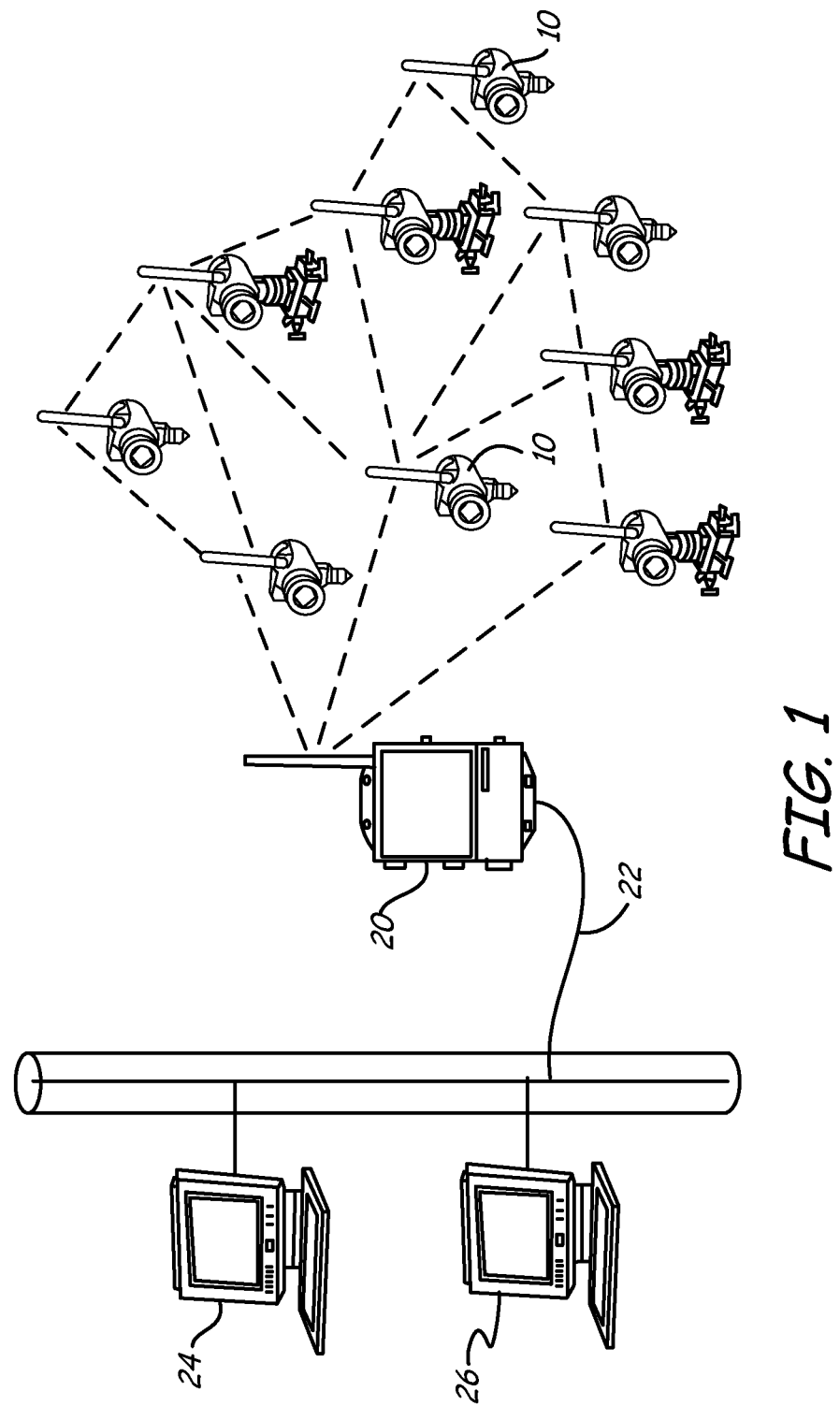
FIG. 1 is a diagrammatic view of a wireless process control environment in which embodiments of the present invention are particularly useful.

FIG. 1 is a diagrammatic view of a wireless process control environment in which embodiments of the present invention are particularly useful. As illustrated in FIG. 1, a plurality of wireless field devices 10 are communicatively coupled either directly or indirectly via wireless communication to wireless gateway 20. Wireless field devices 10 are generally illustrated as wireless process variable transmitters, such as those sold under the trade designation Model 3051S wireless pressure transmitter, from Emerson Process Management, of Chanhassen, Minn. However, those skilled in the art will recognize that wireless field devices 10 can include other types of wireless process variable transmitters, as well as wireless actuators, valve positioners, et cetera. Wireless gateway 20 is configured to communicate with wireless field devices 10 using known wireless process communication protocols, such as the WirelessHART protocol described above. One example of a wireless gateway is sold under the trade designation Model 1420 by Emerson Process Management, of Chanhassen, Minn. Wireless gateway 20 includes one or more wired ports that are configured to couple to a local area network, such as an Ethernet local area network as illustrated at reference numeral 22. By virtue of its wired connection, wireless gateway 20 can provide information to and receive information from any device coupled to local network 22 such as workstations 24 and 26.

The wireless field device network illustrated in FIG. 1 can be considered a mesh network in that some of the field devices communicate with other field devices to pass their communication ultimately on to wireless gateway 20. Thus, a field device that is located too far away from wireless gateway 20 to otherwise communicate directly, can still provide wireless process communication by virtue of communication through one or more other wireless field devices.

Figure 2:
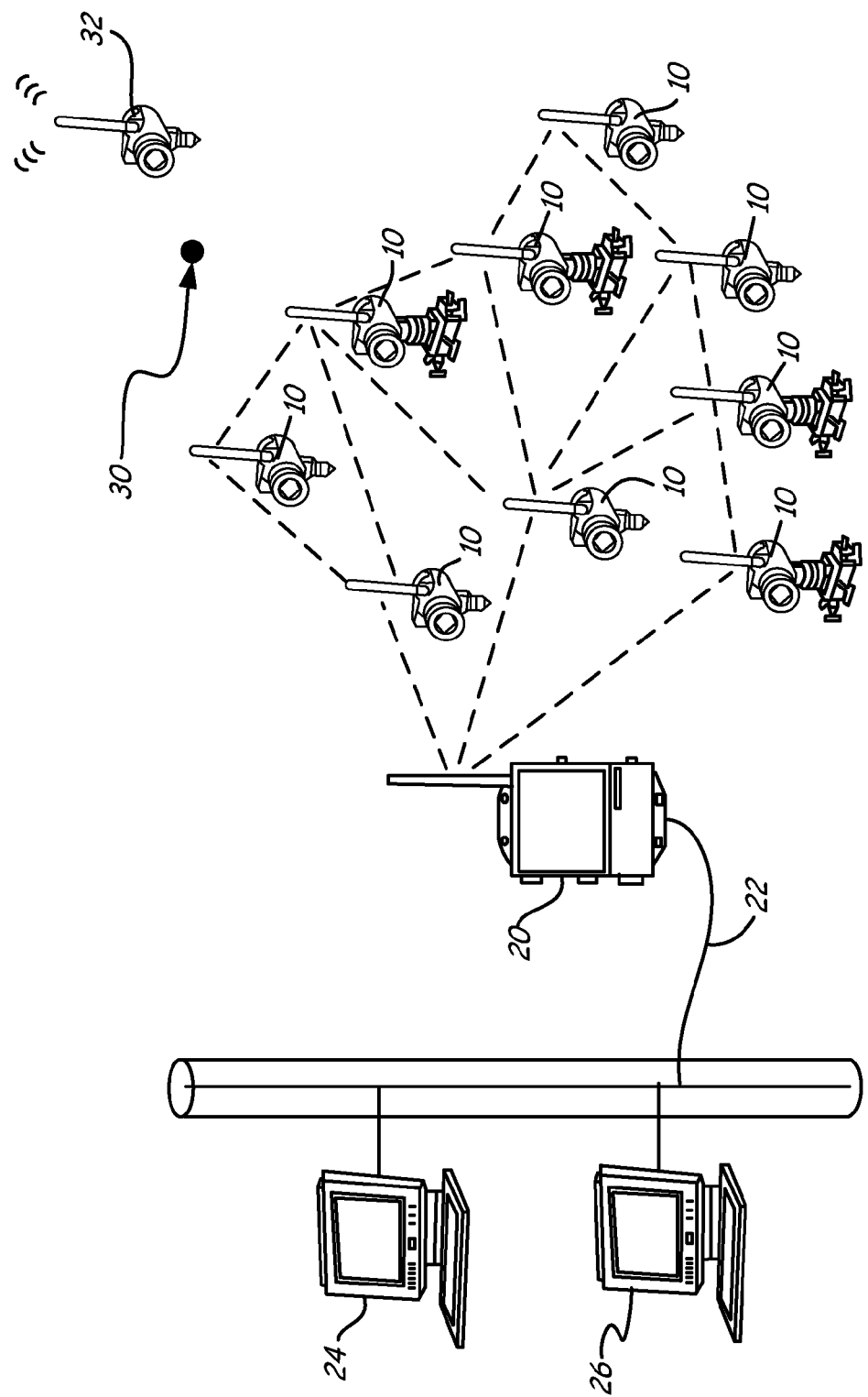
FIG. 2 is a diagrammatic view of a wireless process control environment in which a new wireless field device is being added.

FIG. 2 is a diagrammatic view of a wireless process control environment in which a new wireless field device is being added. When installation of a new wireless field device is required, the process is currently quite cumbersome. For wireless field devices, the physical position of the field device is often very important. This is because the physical position of the device will affect its proximity to other devices in the mesh network as well as proximity to a gateway. Further, sources of electromagnetic interference or physical obstructions may affect a field device more significantly at one position versus another. Thus, when a user is planning to install a new wireless field device into an existing network of wireless field devices, the user will generally perform a number of tasks and evaluations relative to the physical location of the new device.

The user will typically evaluate physical distances between the proposed installation location illustrated at reference numeral 30 in FIG. 2 and other connections points 10 (which in a self-organizing network could be any member of the network) and decide if the distances are within the expected effective communication range of the new wireless field device.

In order to study location 30 in detail, the user will often walk into the field to location 30 and place a wireless test device at location 30. Then, the user will return to one of workstations 24, 26 and access wireless gateway 20 and wait for the wireless test device to join the wireless network. The wireless test device can require up to 10 minutes to join the network. Once the test device does join the network, the user views communication characteristic information relative to the test device through a user interface provided by the wireless gateway. If proposed location 30 is satisfactory, the user then returns to location 30 and replaces the test device with the new wireless field device. However, if position 30 is not satisfactory, the entire process is repeated for an alternate location. If the user is exploring even a few potential locations, the process can quickly consume significant time.

Figure 3:
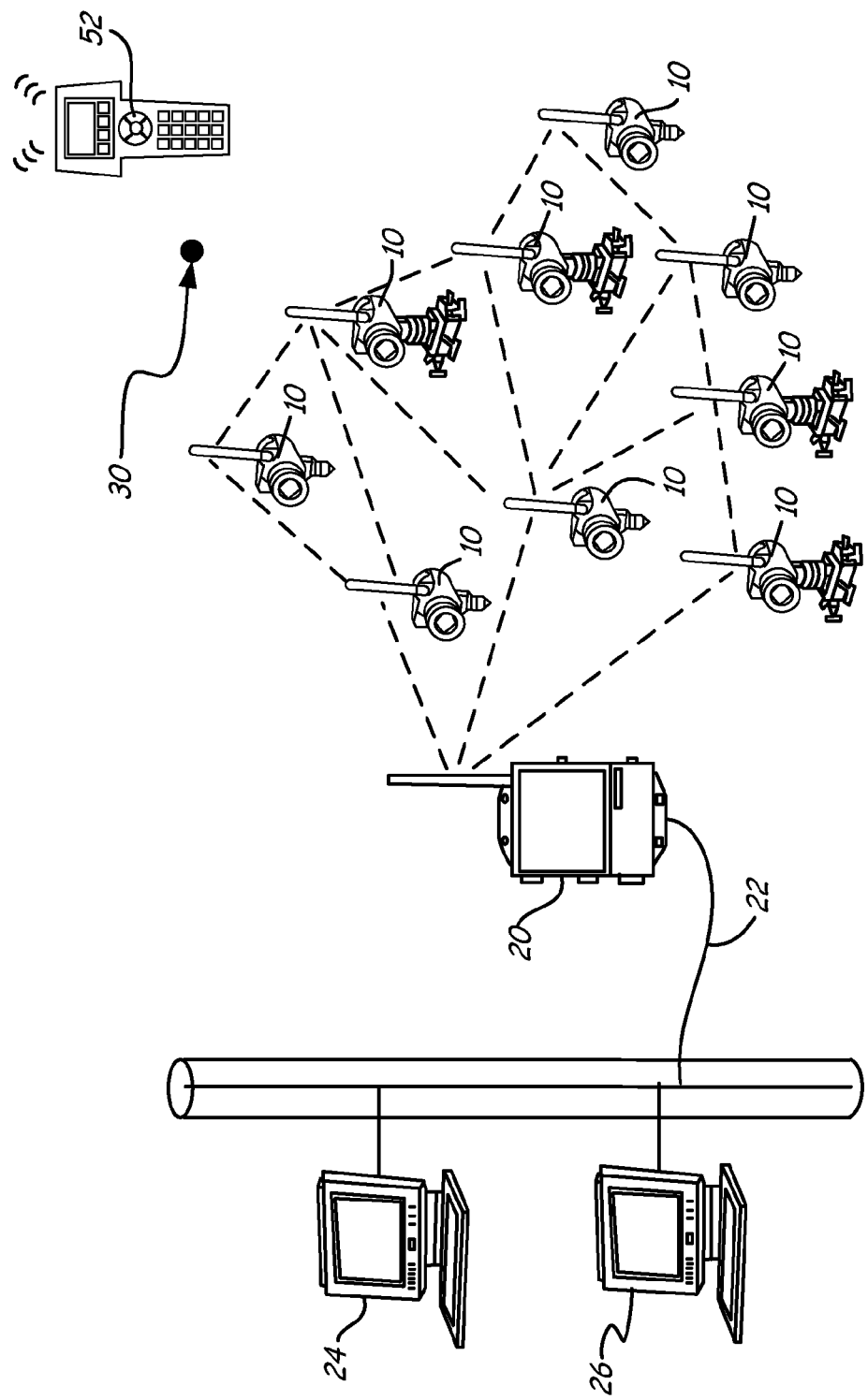
FIG. 3 is a diagrammatic view of a wireless process control environment in which a new wireless field device is being added in accordance with an embodiment of the present invention.

FIG. 3 is a diagrammatic view of a wireless process control environment in which a new wireless field device is being added in accordance with an embodiment of the present invention. The embodiment illustrated with respect to FIG. 3 leverages a new ability of a handheld field maintenance tool to improve the process of adding new wireless field devices to existing wireless networks. Instead of deploying a test field device to proposed location 30, handheld field maintenance tool 52 is used. Tool 52 has a wireless process communication module (Shown in FIG. 5) that allows tool 52 to listen to and communicate directly with field devices 10. Accordingly, when tool 52 is located at position 30, a user can selected a function supplied by tool 52 to cause tool 52 to identify all wireless field devices 10 within communication range of position 30. Tool 52 then displays the wireless field devices 10 within range of position 30. This display may simply include the number of field devices with which tool 52 can communicate at position 30. However, the display can be more sophisticated including a listing of device tags or MAC addresses, and the signal strength at position 30. Additionally, tool 52 can also measure and report other connectivity issues, such as the presence of electromagnetic interference, other process communication networks, communication errors, or any other suitable parameter of interest to a technician deploying a new wireless field device. The embodiment described with respect to FIG. 3 is believed to be particularly applicable to WirelessHART, but any other suitable wireless process communication protocol can be used. Moreover, while the embodiment described with respect to FIG. 3, is illustrated relative to handheld field maintenance tool 52, any device that can communicate on the wireless sensor network and provide useful information to a technician or user may be employed. Thus, tool 52 could simply be a module or device that plugs into a laptop computer or other suitable mobile device. However, since the device is located, at least some of the time, in the field, it is preferred that tool 52 comply with at least one intrinsic safety specification, such as that listed above.

Additionally, or alternatively, the signal quality at position 30 can be evaluated over time. Thus, if position 30 is susceptible to periodic electromagnetic interference, such a study would detect such interference thereby addressing a potentially intermittent communication difficulty. The study of position 30 can be done using a software application resident in one or more field devices 10, gateway 20, or preferably tool 52 to continually or periodically monitor signal strength of each network member over time. Preferably, the monitored signal strength information is stored and combined with geographic information (such as a map of the network) to provide a user with a graphical, intuitive depiction of signal quality as a function of position in the wireless process network. This map is termed a network heat map and can be used to graphically depict past history of signal strength to 1, 2, 3, 4 . . . et cetera devices in the area of position 30. Further, the application, in some embodiments, illustrates the lowest signal strength to 1, 2, 3 . . . et cetera wireless field devices. Further still, in some embodiments, the software application can recommend which wireless sensor network the new field device should join as well as provides an indication of anticipated communication reliability for the new wireless field device.

Figure 4:
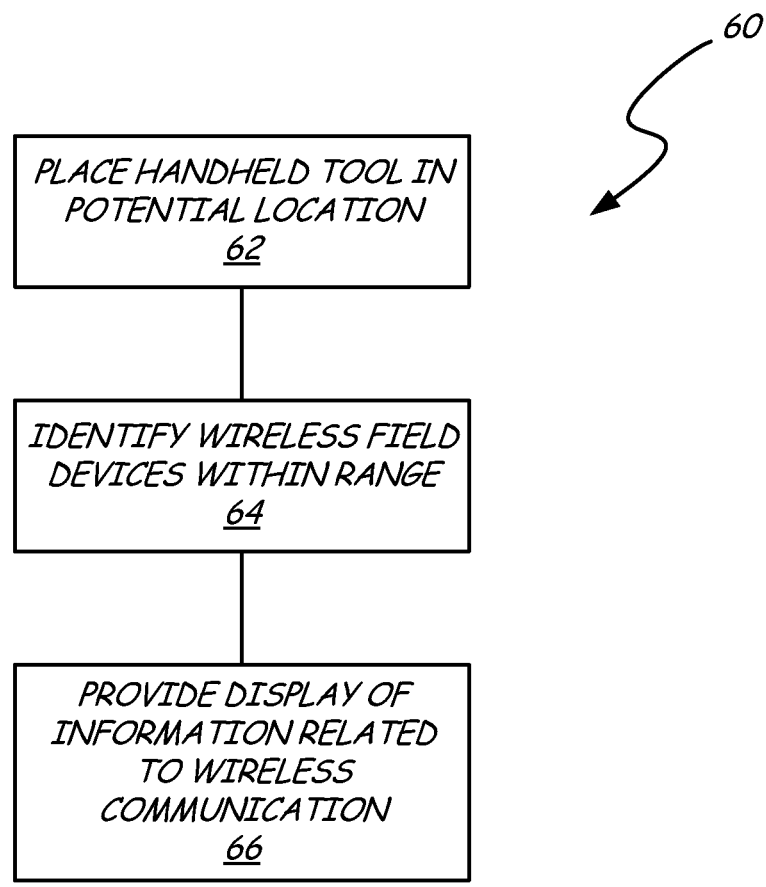
FIG. 4 is a flow diagram of a method of evaluating a potential location for a new wireless field device in accordance with an embodiment of the present invention.

FIG. 4 is a flow diagram of a method of evaluating a potential location for a new wireless field device in accordance with an embodiment of the present invention. Method 60 begins at block 62 where a handheld field maintenance tool is placed at a proposed location of a new wireless field device. Next, at block 64, the handheld field maintenance tool identifies at least some wireless field devices within range of the handheld field maintenance tool. Preferably, the handheld field maintenance tool identifies all wireless field devices within range during block 64. At block 66, the handheld field maintenance tool provides information related to the wireless communication to a user via a display of the handheld field maintenance tool. This information may be the number of field devices found; the device tags of the field devices; the signal strength relative to each field device, et cetera.

Figure 5:
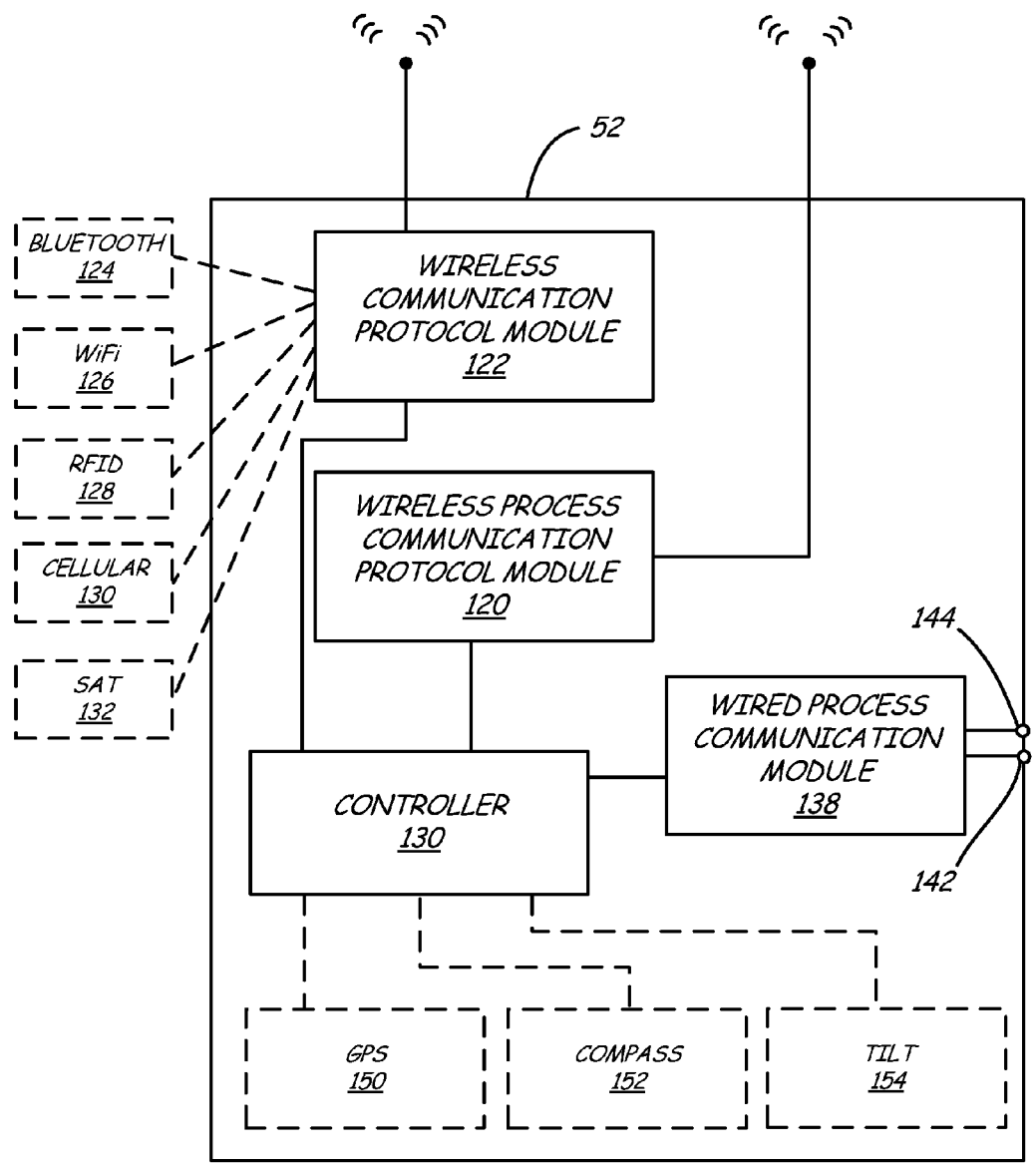
FIG. 5 is a diagrammatic system block diagram of a handheld field maintenance tool in accordance with the embodiment of the present invention.

FIG. 5 is a diagrammatic system block diagram of a handheld field maintenance tool in accordance with the embodiment of the present invention. It is preferred that tool 52 comply with at least one intrinsic safety specification, such as that listed above, in order to help ensure safety in potentially explosive environments.

Handheld field maintenance tool 52 includes at least one wireless process communication module 120. Suitable examples for wireless process communication module 120 include a module that generates and/or receives proper signals in accordance with a known wireless communication protocol, such as the WirelessHART protocol described above. Another suitable wireless process communication protocol is that set forth in ISA100.11a described above. While FIG. 5 shows a single wireless process communication module 120, it is expressly contemplated that any suitable number of wireless process communication modules can be used to communicate in accordance with various wireless process communication protocols now in existence or later developed.

Handheld field maintenance tool 52 also includes at least one secondary wireless communication protocol module 122. Wireless communication protocol module 122 can communicate in accordance with one or more of the options shown in phantom in FIG. 5. Specifically, wireless communication protocol module 122 may communicate in accordance with a Bluetooth specification 124; a Wi-Fi specification 126; a known RFID specification 128; cellular communication techniques 130; and/or satellite communication 132. These communication techniques and methodologies allow handheld field maintenance tool 52 to communicate directly with wireless gateway 20 either via direct wireless communication, or using the Internet to which a wireless gateway is generally coupled. While one wireless communication protocol module 122 is shown in FIG. 5, any suitable number may be used. Each of the wireless process communication protocol module 120 and wireless communication protocol module 122 is coupled to controller 130 which is also coupled to the wired process communication module 138. Controller 130 is preferably a microprocessor that executes a sequence of instructions to perform handheld field maintenance tasks. Wired process communication module 138 allows the handheld field maintenance tool to be physically coupled via a wired connection at terminals 142, 144 to a field device. Examples of suitable wired process communication include the highway addressable remote transducer (HART®) protocol, the FOUNDATION™ Fieldbus protocol, and others.

Handheld field maintenance tool 52 can include a number of optional items that facilitate additional embodiments of the present invention. Specifically, tool 52 can include a position detection module, such as GPS module 150. GPS module 150 can be configured to additionally use the Wide Area Augmentation System (WAAS) for improved accuracy and/or can be configured to operate using differential GPS techniques as appropriate. Module 150 is coupled to controller 130 to provide controller 130 with an indication of the geographic position of tool 52. Additionally, tool 52 also preferably comprises compass module 152 coupled to controller 130 such that tool 52 can indicate the direction in which it is pointing. Finally, tool 52 can also include tilt module 154 coupled to controller 130 to provide an indication to controller 130 relative to an angle of inclination of tool 52 relative to gravity. However, additional axes of sensing are also contemplated.

The optional components of tool 52 are particularly useful in embodiments of the present invention where a handheld field maintenance tool helps a technician or engineer find the physical location of a wireless field device in the field. An oil refinery is often a very large process installation with many field devices positioned at various locations, some of which may not be readily visible. When a technician or engineer needs to physically locate a field device to perform engineering, setup and maintenance tasks, the technician or engineer would previously need to perform one of the following tasks. The technician or engineer would be forced to search for the field device based on memory or word-of-mouth directions. Alternatively, the technician or engineer would look up the field device in engineering drawings, which often do not contain detailed information about the physical location of the device. Then, based on that often limited information, the technician or engineer would attempt to physically find the device in the plant or process installation.

Figure 6:
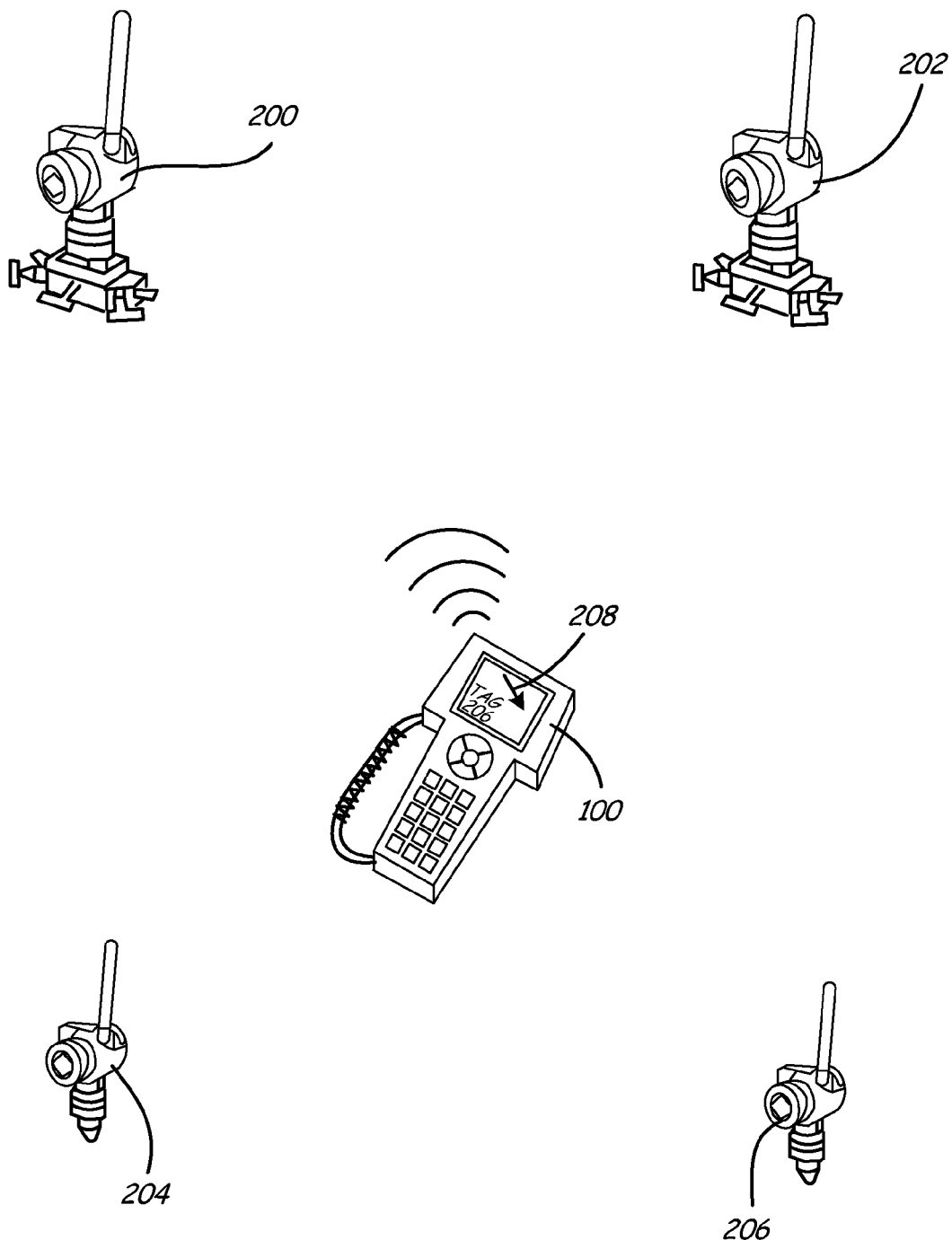
FIG. 6 is a diagrammatic view of a method of locating a selected field device using a handheld field maintenance tool in accordance with an embodiment of the present invention.

FIG. 6 is a diagrammatic view of a process of finding a wireless field device using a handheld field maintenance tool to locate a selected field device in accordance with an embodiment of the present invention. Handheld field maintenance tool 100 can be identical to tool 52 described above with respect to FIG. 5. However, a different reference numeral is used because it need not be the same. Tool 100 includes a user interface (in the form of a keypad, navigation buttons, and a display) that allows a technician or engineer to select a specific field device to locate. Such selection will generally be in the form of selecting a device tag or identifier, but may take any suitable form. In the example shown in FIG. 6, the technician has selected wireless field device 206 among devices 200, 202, 204, and 206. While four field devices are illustrated, in reality, the field devices could number in the hundreds with field devices dispersed throughout the factory or process installation. Preferably, handheld field maintenance tool 100 contains a map of the process installation that is either pre-loaded into the handheld field maintenance tool, or communicated wirelessly to tool 100 through any suitable means. Additionally, in the event that handheld field maintenance tool 100 has previously interacted with the selected field device (such as during installation of the field device) handheld field maintenance tool 100 may have acquired information that relates the position (as indicated by the GPS module at the time of the previous interaction) to the device. This position information can be written to the field device, stored in handheld field maintenance tool 100 or both. It is also contemplated that handheld field maintenance tool 100 or a different handheld field maintenance tool can access the wireless field device using any suitable wireless communication and receive from the wireless field device location information indicative of a position of the wireless field device. Once the device tag is identified, the handheld field maintenance tool obtains position information, preferably from GPS module 150 relative to the position of tool 100. Once tool 100 knows its own position, it generates an indication, vector, route, or other suitable directions to help the technician or engineer travel to the physical location of field device 206. Preferably, the map includes an indication of tool 100 on the map so the user can gauge progress to the destination (field device 206) Additionally, since the technician is usually walking, and GPS heading information is based on movement, tool 100 may use its optional compass to provide the user with a directional indication 208 that points or leads the technician or engineer to the selected field device 206 even when the technician or engineer is standing still. Finally, since at least some process installations such as refineries may have field devices positioned tens or hundreds of feet above the ground, tool 100 can use tilt module 154 to cause the technician or engineer to incline tool 100 at an angle that causes the tool to be essentially aimed at field device 206. Thus, if a user reaches a position where field device 206 is supposed to be, but field device 206 is actually located far overhead, tool 100 would indicate an angle of incline that would direct the user's attention to the proper elevation to locate the field device.

Figure 7:
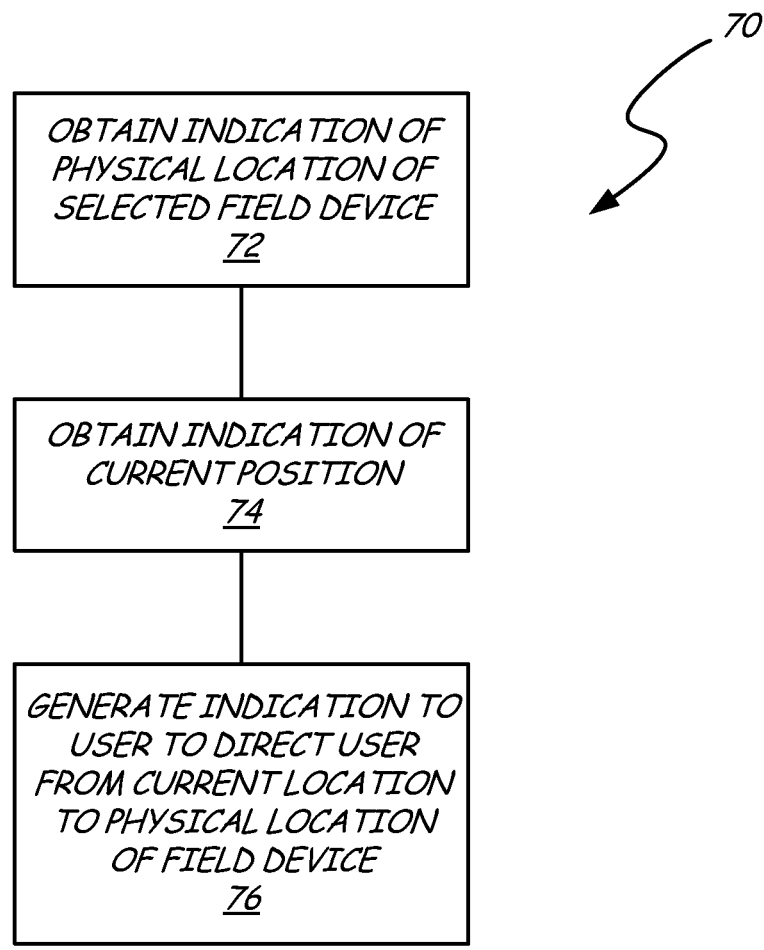
FIG. 7 is a flow diagram of a method of locating a selected field device using a handheld field maintenance tool in accordance with an embodiment of the present invention.

FIG. 7 is a flow diagram of a method of locating a selected field device using a handheld field maintenance tool in accordance with an embodiment of the present invention. Method 70 begins at block 72 where an indication of a physical location of a selected field device is obtained by a handheld field maintenance tool. This may be done by accessing an internal pre-loaded database within the handheld field maintenance tool that correlates all device tags in the process installation to physical positions. Alternatively, the handheld field maintenance tool can generate a query based on the selected device identification to a suitable server or computing device in an asset management system to receive position information relative to the selected device. As set forth above, since the handheld field maintenance tool has ample wireless communication abilities, this query may be submitted while the user is in the field. Next, at block 74, the handheld field maintenance tool determines its current position. This can be done in any suitable manner, but preferably includes accessing an internal GPS module, such as module 150. Then, the controller of the handheld field maintenance tool processes the physical location of the selected field device and the current position of the handheld field maintenance tool to provide an indication to the user to direct the user toward the physical location of the selected wireless field device.

Figure 8:
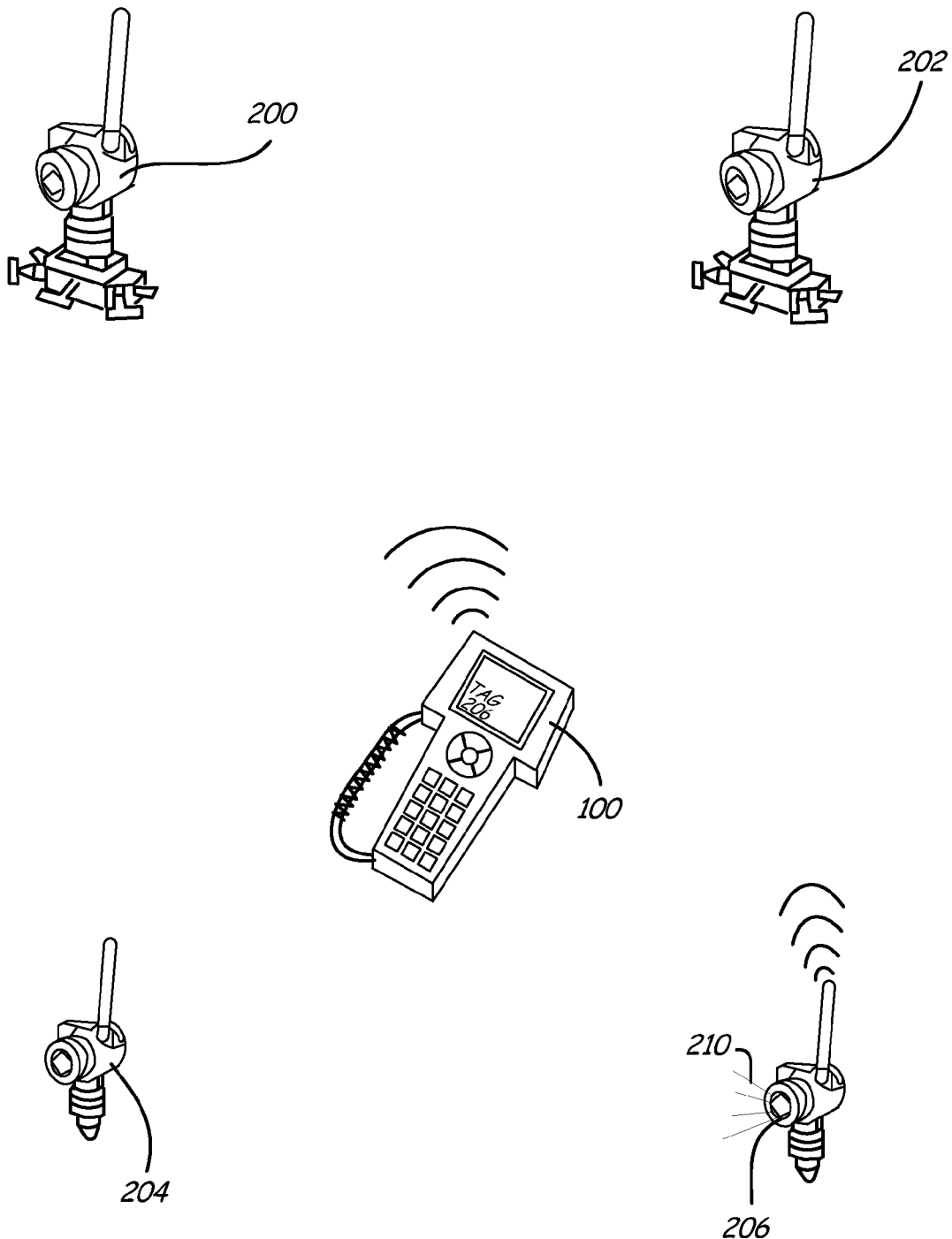
FIG. 8 is a diagrammatic view of a method of locating a selected field device in accordance with another embodiment of the present invention.

Another aid for the technician or engineer's search for the wireless field device is illustrated with respect to FIG. 8. Specifically, once the user has selected a field device to locate, the handheld field maintenance tool 100 can communicate on the wireless sensor network in which the field device is located to cause the field device to generate a local annunciation to help capture the user's attention. This local annunciation 210 can be in the form of an audible alert or siren, a flashing light or indicator, or both. Thus, as the technician or engineer is walking near the field device, the field device's sounds and lights will help the technician or engineer focus on the desired field device.

Figure 9:
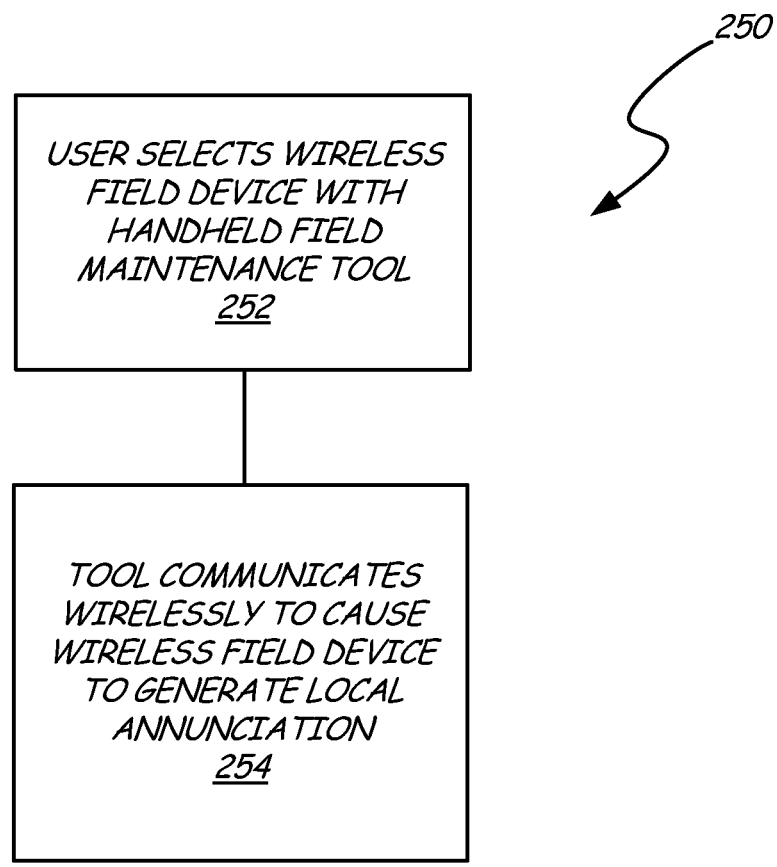
FIG. 9 is a flow diagram of a method of locating a selected field device in accordance with another embodiment of the present invention.

FIG. 9 is a flow diagram of a method of locating a selected field device in accordance with another embodiment of the present invention. Method 250 begins at block 252 where a user selects a wireless field device with a handheld field maintenance tool. Next, at block 254, the handheld field maintenance tool generates suitable wireless communication, preferably wireless process communication, to cause the selected field device to generate a local annunciation.

While each of the embodiments described with respect to FIGS. 6 and 8 can be practiced separately, combinations of the embodiments are also useful. For example, the user can obtain and follow a map to arrive in the general area of the selected field device. Then, once handheld field maintenance tool senses proximity above a certain threshold to the field device, the handheld field maintenance tool can automatically interact with the field device through the wireless sensor network to cause the field device to generate the local annunciation and confirm the location of the field device. Further still, if the user reaches the location of the selected field device and cannot find it, the user may also obtain additional location assistance information using the handheld field maintenance tool. For example, the user may download an image of the field device located in its position. The user can then view the image and compare it to the user's physical reality to find the field device.

Although the present invention has been described with reference to particular embodiments, workers skilled in the art will recognize that changes may be made in form and detail without departing from the spirit and scope of the invention.

What is claimed is:

1. A method of locating and directing a user to a selected field device in a process installation with a handheld field maintenance tool, the method comprising:
   detecting a physical location of the selected field device via a wireless communication module of the handheld field maintenance tool, wherein detecting the physical location comprises submitting a query to a server over a wireless connection, wherein the query comprises an identification of the selected field device;
   detecting a current position of the handheld field maintenance tool, wherein detecting the current position of the handheld field maintenance tool comprises accessing an internal GPS module of the handheld field maintenance tool;
   generating, automatically, an indication, based at least in part on the detected physical location and at least in part on the detected current position, on the handheld field maintenance tool that directs the user of the handheld field maintenance tool from the detected current position to the detected physical location of the selected field device; and
   automatically generating a local annunciation at the selected field device when the current position is within a threshold proximity of the physical location of the selected field device.

2. The method of claim 1, wherein generating an indication to the user includes presenting the user with a map indicating the current position and the physical location of the selected field device.

3. The method of claim 1, wherein the handheld field maintenance tool complies with at least one intrinsic safety specification.

4. The method of claim 1, wherein the indication includes a heading.

5. A method of locating and directing a user to a selected field device in a process installation with a handheld field maintenance tool, the method comprising:
   detecting a physical location of the selected field device via a wireless communication module of the handheld field maintenance tool, wherein detecting the physical location comprises submitting a query to a server over a wireless connection, wherein the query comprises an identification of the selected field device;
   detecting a current position of the handheld field maintenance tool, wherein detecting the current position of the handheld field maintenance tool comprises accessing an internal GPS module of the handheld field maintenance tool;

generating, automatically, an indication, based at least in part on the detected physical location and at least in part on the detected current position, on the handheld field maintenance tool that directs the user of the handheld field maintenance tool from the detected current position to detected physical location of the selected field device;

and wherein the indication includes an elevation angle.

\* \* \* \* \*